United States Patent
Provine et al.

(10) Patent No.: US 8,359,309 B1
(45) Date of Patent: Jan. 22, 2013

(54) MODIFYING SEARCH RESULT RANKING BASED ON CORPUS SEARCH STATISTICS

(75) Inventors: John R. Provine, Menlo Park, CA (US); Claudio Basile, Palo Alto, CA (US); Alexander L. Vasserman, Malden, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/022,366

(22) Filed: Feb. 7, 2011

Related U.S. Application Data

(63) Continuation of application No. 11/752,894, filed on May 23, 2007, now abandoned.

(51) Int. Cl.
*G06F 7/00* (2006.01)
*G06F 17/30* (2006.01)

(52) U.S. Cl. .................. 707/721; 707/725; 707/748

(58) Field of Classification Search .................. 707/748, 707/725, 749, 750, 727, 721
See application file for complete search history.

(56) References Cited

U.S. PATENT DOCUMENTS

| | | | |
|---|---|---|---|
| 5,265,065 A | 11/1993 | Turtle | |
| 5,920,854 A | 7/1999 | Kirsch | |
| 6,067,565 A | 5/2000 | Horvitz | |
| 6,134,532 A | 10/2000 | Lazarus et al. | |
| 6,185,558 B1 | 2/2001 | Bowman et al. | |
| 6,202,058 B1 | 3/2001 | Rose et al. | |
| 6,327,590 B1 | 12/2001 | Chidlovskii et al. | |
| 6,363,378 B1 | 3/2002 | Conklin et al. | |
| 6,480,843 B2 | 11/2002 | Li | |
| 6,490,575 B1 | 12/2002 | Berstis | |
| 6,671,681 B1 | 12/2003 | Emens et al. | |
| 6,725,259 B1 | 4/2004 | Bharat | |
| 6,738,764 B2 | 5/2004 | Mao et al. | |
| 6,792,416 B2 | 9/2004 | Soetarman et al. | |
| 6,873,982 B1 | 3/2005 | Bates et al. | |
| 6,912,505 B2 | 6/2005 | Linden et al. | |
| 6,944,609 B2 | 9/2005 | Witbrock | |
| 6,944,612 B2 | 9/2005 | Roustant et al. | |
| 6,970,863 B2 | 11/2005 | Cragun et al. | |
| 7,035,812 B2 * | 4/2006 | Meisel et al. | 705/14.54 |
| 7,043,471 B2 * | 5/2006 | Cheung et al. | 707/999.003 |
| 7,072,886 B2 | 7/2006 | Salmenkaita et al. | |
| 7,085,761 B2 | 8/2006 | Shibata | |
| 7,113,939 B2 | 9/2006 | Chou et al. | |
| 7,146,361 B2 | 12/2006 | Broder et al. | |
| 7,222,127 B1 | 5/2007 | Bem et al. | |
| 7,231,399 B1 | 6/2007 | Bem et al. | |
| 7,254,587 B2 * | 8/2007 | Lee et al. | 707/999.104 |
| 7,346,839 B2 | 3/2008 | Acharya et al. | |

(Continued)

OTHER PUBLICATIONS

Po-Hsiang Wang, et al. QueryFind: Search Ranking Based on Users' Feedback and Expert's Agreement, Mar. 28-31, 2004, IEEE International Conference on e-Technology, 10.1109/EEE.2004.1287326, p. 299-304.

(Continued)

*Primary Examiner* — James Trujillo
*Assistant Examiner* — Pavan Mamillapalli
(74) *Attorney, Agent, or Firm* — Fish & Richardson P.C.

(57) ABSTRACT

Methods, systems, and apparatus, including computer program products, for ranking search results of a search query using corpus search statistics. In one aspect, a method includes determining a first relevance of a first corpus to a search query, determining a second relevance of a second corpus to the search query, determining a measure of relative relevance of the first corpus and the second corpus to the search query, and providing the measure of relative relevance to a ranking engine for ranking of search results for a new search corresponding to the search query.

24 Claims, 5 Drawing Sheets

U.S. PATENT DOCUMENTS

| | | | |
|---|---|---|---|
| 7,379,951 B2 | 5/2008 | Chkodrov et al. | |
| 7,395,259 B2 * | 7/2008 | Bailey et al. | 707/999.002 |
| 7,401,072 B2 * | 7/2008 | Piscitello et al. | 707/999.005 |
| 7,444,327 B2 * | 10/2008 | Watson et al. | 707/999.005 |
| 7,516,146 B2 | 4/2009 | Robertson et al. | |
| 7,542,969 B1 * | 6/2009 | Rappaport et al. | 707/999.004 |
| 7,565,363 B2 | 7/2009 | Anwar | |
| 7,577,643 B2 | 8/2009 | Dominowska et al. | |
| 7,725,463 B2 * | 5/2010 | Hurst-Hiller et al. | 707/723 |
| 7,925,498 B1 | 4/2011 | Baker et al. | |
| 8,001,136 B1 | 8/2011 | Papachristou et al. | |
| 8,037,086 B1 | 10/2011 | Upstill et al. | |
| 2002/0034292 A1 | 3/2002 | Tuoriniemi et al. | |
| 2002/0103790 A1 | 8/2002 | Wang et al. | |
| 2003/0167252 A1 | 9/2003 | Odom et al. | |
| 2004/0006740 A1 | 1/2004 | Krohn et al. | |
| 2004/0039734 A1 | 2/2004 | Judd et al. | |
| 2004/0093325 A1 | 5/2004 | Banerjee et al. | |
| 2004/0186828 A1 | 9/2004 | Yadav et al. | |
| 2004/0199419 A1 | 10/2004 | Kim et al. | |
| 2005/0004889 A1 | 1/2005 | Bailey et al. | |
| 2005/0015366 A1 | 1/2005 | Carrasco et al. | |
| 2005/0060310 A1 | 3/2005 | Tong et al. | |
| 2005/0060311 A1 | 3/2005 | Tong et al. | |
| 2005/0102282 A1 | 5/2005 | Linden et al. | |
| 2005/0160083 A1 | 7/2005 | Robinson | |
| 2005/0192946 A1 | 9/2005 | Lu et al. | |
| 2005/0240576 A1 * | 10/2005 | Piscitello et al. | 707/3 |
| 2005/0240580 A1 | 10/2005 | Zamir et al. | |
| 2005/0256848 A1 | 11/2005 | Alpert et al. | |
| 2005/0289140 A1 | 12/2005 | Ford et al. | |
| 2006/0106793 A1 | 5/2006 | Liang | |
| 2006/0167864 A1 | 7/2006 | Bailey et al. | |
| 2006/0200556 A1 | 9/2006 | Brave et al. | |
| 2006/0294100 A1 | 12/2006 | Meyerzon et al. | |
| 2007/0038659 A1 | 2/2007 | Datar et al. | |
| 2007/0112730 A1 | 5/2007 | Gulli et al. | |
| 2007/0130370 A1 | 6/2007 | Akaezuwa | |
| 2007/0156677 A1 | 7/2007 | Szabo | |
| 2007/0214131 A1 | 9/2007 | Cucerzan et al. | |
| 2008/0183660 A1 | 7/2008 | Szulczewski | |

OTHER PUBLICATIONS

U.S. Appl. No. 10/726,345, filed Dec. 3, 2003, Pearson et al.
U.S. Appl. No. 10/878,926, filed Jun. 28, 2004, Battle et al.
U.S. Appl. No. 11/096,726, filed Mar. 31, 2005, Lamping et al.
U.S. Appl. No. 11/556,086, filed Nov. 2, 2006, Diligenti et al.
U.S. Appl. No. 11/556,100, filed Nov. 2, 2006, Diligenti et al.
U.S. Appl. No. 11/556,143, filed Nov. 2, 2006, Kim et al.
U.S. Appl. No. 11/582,767, filed Oct. 17, 2006, Baker et al.
U.S. Appl. No. 11/647,888, filed Dec. 29, 2006, Baker et al.
U.S. Appl. No. 11/651,282, filed Jan. 9, 2007, Heymans.
U.S. Appl. No. 11/685,095, filed Mar. 12, 2007, Kim et al.
U.S. Appl. No. 11/686,288, filed Mar. 14, 2007, Diligenti et al.
U.S. Appl. No. 11/742,447, filed Apr. 30, 2007, Stets et al.
U.S. Appl. No. 11/781,155, filed Jul. 20, 2007, Diligenti.
U.S. Appl. No. 11/841,313, filed Aug. 20, 2007, Corduneanu et al.
U.S. Appl. No. 12/166,617, filed Jul. 2, 2008, Yang.
U.S. Appl. No. 12/331,872, filed Dec. 10, 2008, Le et al.
Agichtein, et al; Improving Web Search Ranking by Incorporating User Behavior Information; Aug. 2006; Proceedings of the Twenty-Ninth Annual International ACM SIGIR Conference on Research and Development in Information Retrieval, p. 19-26.
Agichtein, et al; Learning User Interaction Models for Predicting Web Search Result Performances; Aug. 2006; Proceedings of the Twenty-Ninth Annual International ACM SIGIR Conference on Research and Development in Information Retrieval, p. 3-10.
Bar-Llan, Keenoy, Levene, Yaari; "Presentation Bias is Significant in Determing User Preseference for Search Results—A User X Study"; Journal of the American Society for Information Science and Technology, vol. 60, Issue 1 (p. 135-149) (Sep. 2008).
Bar-Ilan, Mat-Hassan, Levene; "Methods for comparing rankings of search engine results"; Computer Networks: The International Journal of Computer and Telecommunications Networking, vol. 50, Issue 10 (Jul. 2006).
Boyan et al., "A Machine Learning Architecture for Optimizing Web Search Engines", Aug. 1996; Internet-based information systems-Workshop Technical Report-American Association for Artificial Intelligence, p. 1-8.
Burke, Robin, "Integrating Knowledgebased and Collaborative-filtering Recommender Systems", AAAI Technical Report WS-99-01. Compilation copyright ©1999, AAAI (www.aaai.org), pp. 69-72.
Cutrell, et al., "Eye tracking in MSN Search: Investigating snippet length, target position and task types", 2007; Conference on Human Factors in Computing Systems—Proceedings of the SIGCHI Conference on Human Factors in Computing Systems.
Diligenti, et al., "Users, Queries and Documents: A Unified Representation for Web Mining", wi-iat, vol. 1, 2009 IEEE/WIC/ACM International Joint Conference on Web Intelligence and Intelligent Agent Technology, 2009, pp. 238-244.
U.S. Patent Office, U.S. Appl. No. 11/556,086, filed Nov. 2, 2006, in Office Action mailed Jun. 23, 2010, 19 pages.
Google News archive, Jul. 8, 2003, Webmasterworld.com, [online] Retrieved from the Internet http://www.webmasterwolrd.com/forum3/15085.htm [retrieved on Nov. 20, 2009] 3 pages.
Grečar, Miha, User Profiling: Collaborative Filtering, SIKDD 2004, Oct. 12-15, 2004, Ljubljana, Slovenia, 4 pages.
Hofmann, Thomas, Latent Semantic Models for Collaborative Filtering, ACM Transactions on Information Systems, vol. 22, No. 1, Jan. 2004, pp. 89-115.
Joachims T., "Evaluating retrieval performance using clickthrough data", Proceedings of the SIGIR Workshop on Mathematical/Formal Methods in Information Retrieval; Aug. 12-15, 2002; Tampere, Finland; 2002.
Joachims, "Optimizing search engines using clickthrough data", 2002; Proceedings of the ACM SIGKDD International Conference on Knowledge Discovery and Data Mining, p. 133-142.
Joachims. Radlinski; "Search Engines that Learn from Implict Feedback"; Aug. 2007, IEEE Computer Society.
Kelly, et al., "Implicit Feedback for Inferring User Preference: A Bibliography", SIGIR Forum, vol. 37, No. 2 (2003), pp. 18-28.
Lemire, Daniel, "Scale and Translation Invariant Collaborative Filtering Systems, Published in Information Retrieval", 8(1), pp. 129-150, 2005.
Linden, Greg et al., Amazon.com Recommendations: Item-to-Item Collaborative Filtering, [online], http://computer.org/internet/, IEEE Internet Computing, Jan.-Feb. 2003, IEEE Computer Society, pp. 76-80.
Lu, Kuen S., Examiner, U.S. Patent Office, U.S. Appl. No. 11/556,143, filed Nov. 2, 2006, in Office Action mailed Jan. 25, 2010, 14 pages.
Mueller, Kurt A., Examiner, U.S. Patent Office, U.S. Appl. No. 11/685,095, filed Mar. 12, 2007, in Office Action mailed Feb. 8, 2010, 31 pages.
Nicole, Kristen, Heeii is StumbleUpon Plus Google Suggestions, [online], Retrieved from the Internet http://mashable.com/2007/05/15/heeii/, 11 pages.
Radlinski et al., Query Chains: Learning to Rank from Implicit Feedback, KDD '05, Aug. 21-24, 2005, Chicago, Illinois, USA, 10 pages.
Schwab, et al., Adaptivity through Unobstrusive Learning, 2002, 16(3), pp. 5-9.
Stoilova, Lubomira et al., GiveALink: Mining a Semantic Network of Bookmarks for Web Search and Recommendation, LinkKDD '05, Aug. 21, 2005, Chicago, IL, USA, 8 pages.
Xiao, et al., Measuring Similarity of Interests for Clustering Web-Users, ADC, 2001, p. 107-114.
Xie et al., Web User Clustering from Access Log Using Belief Function, K-CAP '01, Oct. 22-23, 2001, Victoria, British Columbia, Canada, pp. 202-208.
Yu et al., Selecting Relevant Instances for Efficient and Accurate Collaborative Filtering, CIKM '01, Nov. 5-10, 2001, Atlanta, Georgia, pp. 239-246.
Zeng et al., Similarity Measure and Instance Selection for Collaborative Filtering, WWW '03, May 20-24, 2003, Budapest, Hungary, pp. 652-658.

* cited by examiner

MODIFYING SEARCH RESULT RANKING BASED ON CORPUS SEARCH STATISTICS

CROSS-REFERENCE TO RELATED APPLICATIONS

This application claims priority under 35 USC §120 to U.S. patent application Ser. No. 11/752,894, filed on May 23, 2007, the entire contents of which are hereby incorporated by reference.

BACKGROUND

The present disclosure relates to ranking of search results.

Internet search engines aim to identify documents or other items that are relevant to a user's needs and to present the documents or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance is premised on the assumption that, if authors of web pages felt that another web site was relevant enough to be linked to, then web searchers would also find the site to be particularly relevant. In short, the web authors "vote up" the relevance of the sites.

Other various inputs may be used instead of or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

Systems, methods, and apparatus including computer program products for ranking search results of a search query using corpus search statistics are described. In general, in one aspect, a computer-implemented method, a computer program product, and a system, respectively, are provided. The computer-implemented method, computer program product, and system include determining a first relevance of a first corpus to a search query, determining a second relevance of a second corpus to the search query, determining a measure of relative relevance of the first corpus and the second corpus to the search query, and providing the measure of relative relevance to a ranking engine for ranking of search results for a new search corresponding to the search query.

Implementations can include one or more of the following features. Determining a relevance of a corpus to the search query can further include determining a click measure based on a number of selections of search results for the search query from the corpus. Determining a relevance of a corpus to the search query can further include determining a search fraction based on a number of searches for the search query issued in the corpus in view of a number of searches for all queries issued in the corpus. Determining a relevance of a corpus to the search query can further include computing a weighted average of a plurality of search fractions, where each search fraction is based on a different subset of searches in the corpus, and each subset of searches represents a different time period. Determining a relevance of a corpus to the search query can further include computing a weighted combination of a plurality of search fractions, where each search fraction is based on a different subset of searches in the corpus, and each subset of searches represents a combination of one or more languages and one or more countries.

Implementations can include one or more of the following features. Determining the measure of relative relevance of the first corpus and the second corpus to the search query can include determining the first relevance of the first corpus as compared to the second relevance of the second corpus. Determining the measure of relative relevance of the first corpus and the second corpus to the search query can include computing a weighted combination of a relative search fraction and a relative click fraction, where the relative search fraction is based on a search fraction for the first corpus relative to a search fraction for the second corpus, the relative click fraction is based on a click measure for the first corpus relative to a click measure for the second corpus, and a click measure for a corpus is based on a number of selections of search results for the search query from the corpus.

Implementations of the system include one or more computers operable to perform instructions, where the one or more computers can include a server operable to interact with a user interface device through a data communication network, and the user interface device is operable to interact with the server as a client.

In general, in one aspect, a computer-implemented method is provided. The computer-implemented method includes presenting a set of search results for a search query, the set of search results including one or more search results from a first corpus and one or more search results from a second corpus, receiving a selection of a search result in the set of search results, the selected search result being a search result from the first corpus, determining a measure of relative relevance of the first corpus and the second corpus to the search query, the determining being based on the selection, and providing the measure of relative relevance to a ranking engine for ranking of search results for a new search corresponding to the search query.

Implementations can include using the selection of the search result from the first corpus to determine a first click measure as a measure of relevance of the first corpus to the search query, and determining the first click measure as compared to a second click measure, where the second click measure is a measure of relevance of the second corpus to the search query.

In general, in one aspect, a computer-implemented method is provided. The computer-implemented method includes, for a set of search queries, determining a measure of relative relevance of a first corpus and a second corpus to each search query in the set of search queries, the measure of relative relevance being based on a plurality of searches for each search query, the plurality of searches including one or more searches issued in the first corpus and one or more searches issued in the second corpus, and in response to a new search corresponding to a search query in the set of search queries, ranking search results from the first corpus, where the ranking is based on the measure of relative relevance of the first corpus and the second corpus to the search query.

Implementations can include selecting the set of search queries, where the set of search queries is a subset of the set of all possible or actual search queries.

Particular embodiments of the subject matter described in this specification can be implemented to realize one or more of the following advantages. Search log data can be used to predict which corpora provide results that are most relevant for a given query. Statistics for query-corpus pairs can be recorded and stored, and given a query, the system can predict which corpora will have the most relevant content based on statistics of the number of searches and clicks for that query in each of various corpora. The measures of relevance can be used as a signal to modify a baseline ranking function. If the statistics suggest that a corpus does not provide relevant results for a given query, the information retrieval system can avoid unnecessarily searching the corpus for new searches of the given query. A large fraction of the query stream can be impacted by considering a relatively small fraction of possible queries. Search and click data for various corpora can be stored in a simple form, which allows the data to be filtered or modified more easily than filtering or modifying data from some predictive models based on machine learning.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
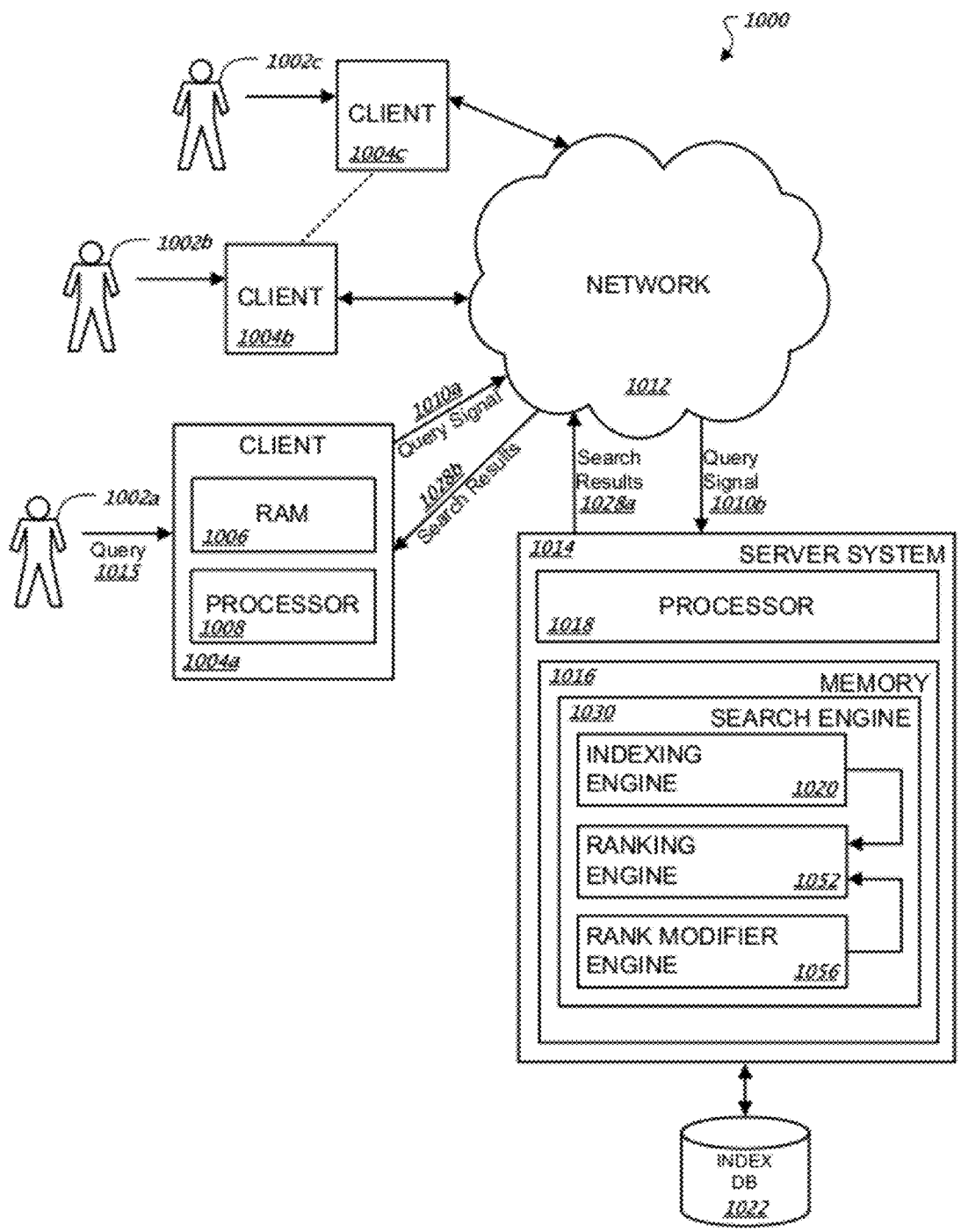
FIG. 1 shows an example information retrieval system in which the relevance of results obtained for submitted search queries can be improved.

FIG. 1 shows an example system 1000 for improving the relevance of results obtained from submitting search queries as can be implemented in an internet, intranet, or other client/server environment. The system 1000 is an example of an information retrieval system in which the systems, components, and techniques described below can be implemented. Although several components are illustrated, there may be fewer or more components in the system 1000. Moreover, the components can be distributed on one or more computing devices connected by one or more networks or other suitable communication mediums.

A user 1002 (1002a, 1002b, 1002c) can interact with the system 1000 through a client device 1004 (1004a, 1004b, 1004c) or other device. For example, the client device 1004 can be a computer terminal within a local area network (LAN) or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002a can connect to a search engine 1030 within a server system 1014 to submit a query 1015. When the user 1002a submits the query 1015 through an input device attached to a client device 1004a, a client-side query signal 1010a is sent into a network 1012 and is forwarded to the server system 1014 as a server-side query signal 1010b. Server system 1014 can be one or more server devices in one or more locations. A server device 1014 includes a memory device 1016, which can include the search engine 1030 loaded therein. A processor 1018 is structured to process instructions within the system 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a user interface of the client device 1004 (e.g., a search results web page displayed in a web browser).

The server-side query signal 1010b is received by the search engine 1030. The search engine 1030 uses the information within the user query 1015 (e.g., query terms) to find relevant documents. The search engine 1030 can include an indexing engine 1020 that actively searches a corpus (e.g., web pages, images, news articles, etc. on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. Appropriate techniques can also be used to identify and eliminate attempts to cast false votes so as to artificially drive up the relevance of a page.

To further improve such traditional document ranking techniques, the ranking engine 1052 can receive an additional signal from a rank modifier engine 1056 to assist in determining an appropriate ranking for the documents. The rank modifier engine 1056 provides one or more prior models, or one or more measures of relevance for the documents based on one or more prior models, which can be used by the ranking engine 1052 to improve the search results' ranking provided to the user 1002. In general, a prior model represents a background probability of document result selection given the values of multiple selected features, as described further below. The rank modifier engine 1056 can perform one or more of the operations described below to generate the one or more prior models, or the one or more measures of relevance based on one or more prior models.

The search engine 1030 can forward the final, ranked result list within a server-side search results signal 1028a through the network 1012. Exiting the network 1012, a client-side search results signal 1028b can be received by the client device 1004a where the results can be stored within the RAM 1006 and/or used by the processor 1008 to display the results on an output device for the user 1002a.

Figure 2:
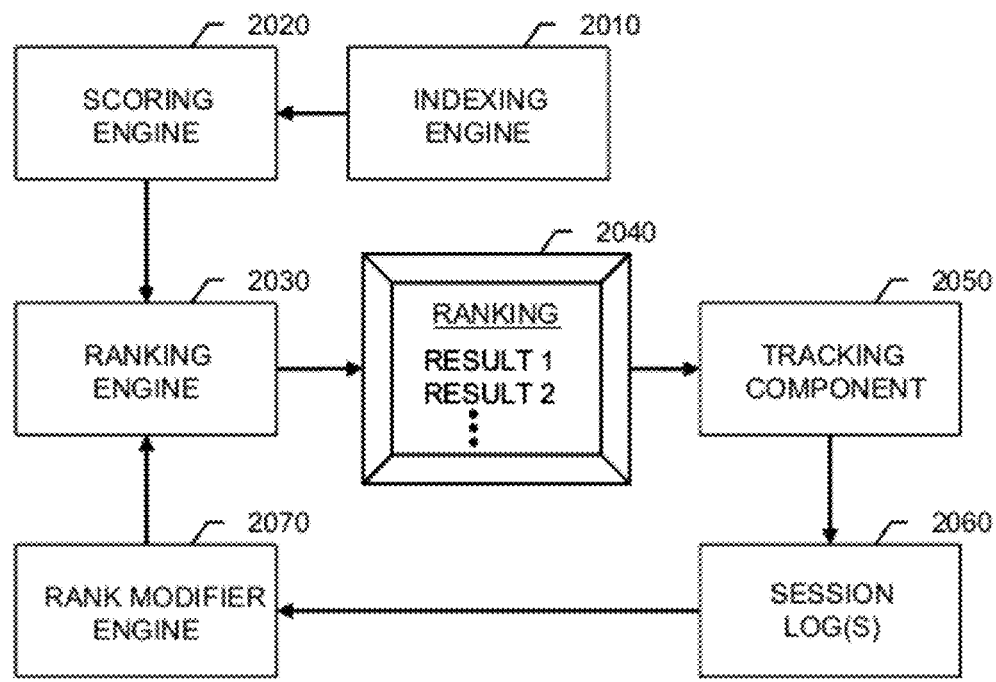
FIG. 2 shows example components of an information retrieval system.

FIG. 2 shows example components of an information retrieval system. These components can include an indexing engine 2010, a scoring engine 2020, a ranking engine 2030, and a rank modifier engine 2070. The indexing engine 2010 can function as described above for the indexing engine 1020. In addition, the scoring engine 2020 can generate scores for document results based on many different features, including content-based features that link a query to document results, and query-independent features that generally indicate the quality of document results. The content-based features can include aspects of document format, such as query matches to title or anchor text in an HTML (Hyper Text Markup Language) page. The query-independent features can include aspects of document cross-referencing, such as a score or figure of merit of the document or the domain. Moreover, the particular functions used by the scoring engine 2020 can be tuned, to adjust the various feature contributions to the final IR score, using automatic or semi-automatic processes.

The ranking engine 2030 can produce a ranking of document results 2040 for display to a user based on IR scores received from the scoring engine 2020 and one or more signals from the rank modifier engine 2070. A tracking component 2050 can be used to record information regarding individual user selections of the results presented in the ranking 2040. For example, the tracking component 2050 can be embedded JavaScript code included in a web page ranking 2040 that identifies user selections (clicks) of individual document results and also identifies when the user returns to the results page, thus indicating the amount of time the user spent viewing the selected document result. In other implementations, the tracking component 2050 can be a proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user. In some implementations, the tracking component 2050 can be used to record the search queries issued to one or more corpora.

The recorded information, including result selection information, can be stored in session log(s) 2060. In some implementations, search data and result selection information are stored in search logs. In some implementations, the recorded information includes log entries that indicate, for each user selection, the query (Q), the document (D), the time (T) between two successive selections of search results, the language (L) employed by the user, and the country (C) where the user is likely located (e.g., based on the server used to access the IR system). In some implementations, other information is also recorded regarding user interactions with a presented ranking, including negative information, such as the fact that a document result was presented to a user, but was not clicked, position(s) of click(s) in the user interface, IR scores of clicked results, IR scores of all results shown before the clicked result, the titles and snippets shown to the user before the clicked result, the user's cookie, cookie age, IP (Internet Protocol) address, user agent of the browser, etc. Still further information can be recorded, such as the search results returned for a query, where the search results are content items categorized into one or more corpora. In some implementations, similar information (e.g., IR scores, position, etc.) is recorded for an entire session, or multiple sessions of a user. In some implementations, the recording of similar information is not associated with user sessions. In some implementations, such information is recorded for every click that occurs both before and after a current click.

The information stored in the session log(s) 2060 or in search logs can be used by the rank modifier engine 2070 in generating the one or more signals to the ranking engine 2030. In general, a wide range of information can be collected and used to modify or tune the signal from the user to make the signal, and the future search results provided, a better fit for the user's needs. Thus, user selections of one or more corpora for issuing searches and user interactions with the search results presented to the users of the information retrieval system can be used to improve future rankings.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 3:
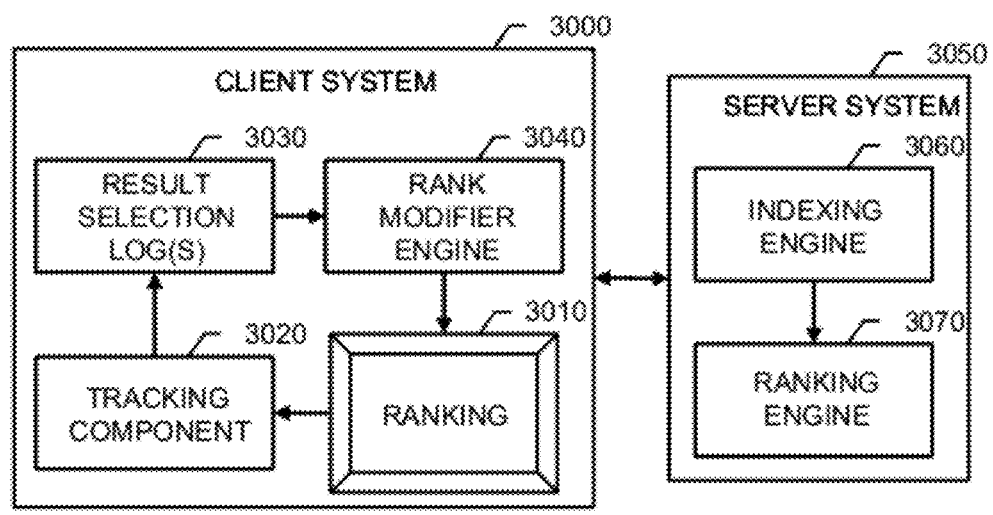
FIG. 3 shows another example information retrieval system.

FIG. 3 shows another example information retrieval system. In this system, a server system 3050 includes an indexing engine 3060 and a ranking engine 3070. A client system 3000 includes a user interface for presenting a ranking 3010, a tracking component 3020, result selection log(s) 3030, and a rank modifier engine 3040. For example, the client system 3000 can include a company's enterprise network and personal computers, in which a browser plug-in incorporates the rank modifier engine 3040. When an employee in the company initiates a search on the server system 3050, the ranking engine 3070 can return the search results along with either an initial ranking or the actual IR scores for the results. The browser plug-in can then re-rank the results locally based on tracked page selections for the company-specific user base.

Figure 4:
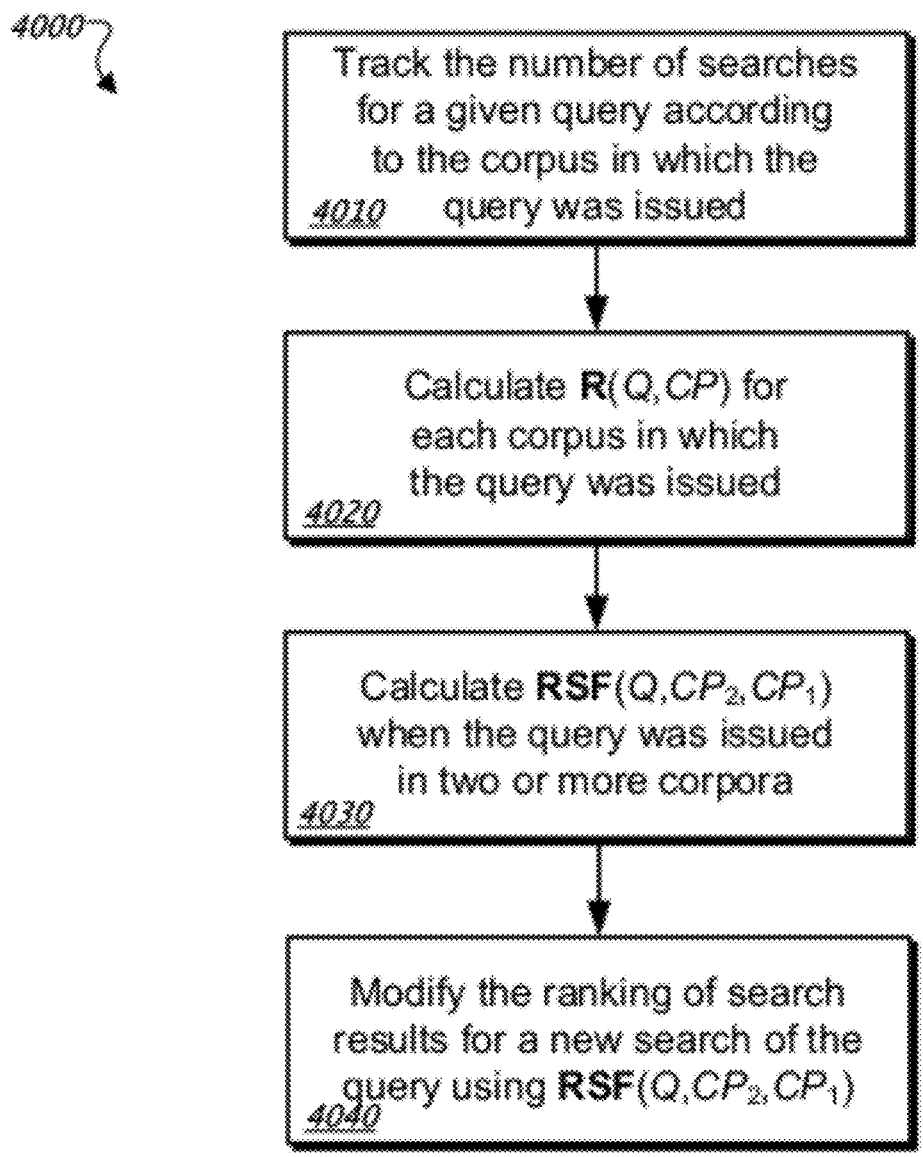
FIG. 4 shows an example process of generating a measure of relative relevance for a corpus for a given query for use in improving the ranking of search results.

FIG. 4 shows an example process 4000 of generating a measure of relative relevance for a corpus for a given query for use in improving the ranking of search results. A corpus is a collection or repository of content, where the content items generally share one or more common properties or characteristics. The categorization of content items into one or more corpora can be determined a priori, for example, by the information retrieval system. The categorization can be done using automatic or manual techniques or both. In a web based information retrieval system, examples of corpora include web pages, maps, images, news articles, and scholarly literature. Some content items can be categorized into more than one corpus. For example, a news article can appear in a news article corpus and in a blog corpus.

In some implementations, a user issues (i.e., submits) a search query in a particular corpus by entering the query on the search web page for the particular corpus. For example, the query can be entered in a search box of an interface for the search web page. A user selection of a particular corpus in which to issue a search is an a priori (i.e., prior to receiving results) indication of the user preference for a type of result or results with particular properties or characteristics.

In other implementations, a user submits a query to a search web page which is not dedicated to a particular corpus. For example, the search engine can forward the search query to more than one corpus without the user selecting one or more corpora in which to run the search. Alternatively, the search web page can provide advanced search features which allow the user to specify one or more corpora in which to run the search. In some implementations, a particular corpus may not have a dedicated web page or cannot be directly searched by a user, but the content items in the corpus can still be returned as search results in, for example, a unified interface providing search results from multiple corpora.

In the example process 4000, the number of searches issued for a given search query is tracked 4010 according to the corpus in which the query was issued. As an example, in the last M days, the search query dolphins could have been issued in a web page corpus (e.g., a search of web resources) 221,523 times and in an image corpus (e.g., a search directed specifically to a collection of images, for example, images.google.com) 125,231 times.

For each corpus in which the query was issued, a corpus search fraction R(Q,CP) is calculated 4020. The corpus search fraction in the last M days can be defined as $$R(Q,CP)=S(Q,CP)/S(CP)$$

where $S(Q,CP)$ is the number of searches issued for query Q in the corpus CP in the last M days, and $S(CP)$ is the number of searches issued for all queries in the corpus CP in the last M days. $R(Q,CP)$ is the fraction of the queries issued in the corpus CP represented by the query Q in the last M days.

In the dolphins example, if S(dolphins, web)=221,523 and S(web)=5,291,041,936, then R(dolphins, web)=221,523/5,291,041,936≈0.0000419. Similarly, if S(dolphins, image)=125,231 and S(image)=1,340,285,192, then R(dolphins, image)=125,231/1,340,285,192≈0.0000934.

When the query was issued in two or more corpora, a relative search fraction $RSF(Q,CP_2,CP_1)$ is calculated 4030. The relative search fraction in the last M days can be defined as $$RSF(Q,CP_2,CP_1)=R(Q,CP_2)/R(Q,CP_1)$$

where $R(Q,CP_1)$ is the corpus search fraction for a first corpus in the last M days, and $R(Q,CP_2)$ is the corpus search fraction for a second corpus in the last M days. In some implementations, one corpus of the two or more corpora is chosen as the base corpus, and the relative search fractions for the non-base corpora are calculated relative to the base corpus (i.e., the corpus search fraction for the base corpus is the denominator in the relative search fraction calculation). The relative search fraction can then be expressed as RSF(Q,CP), where CP is the second corpus.

In the dolphins example, although the dolphins query issued a greater number of times in the web corpus than in the image corpus over the last M days, the corpus search fraction R(dolphins, image) is higher than the corpus search fraction R(dolphins, web). The relative search fraction RSF(dolphins, image, web)=R(dolphins, image)/R(dolphins, web)=0.0000934/0.0000419≈2.3. This relative search fraction can be read to indicate that the dolphins query was 2.3 times more popular in the image corpus than in the web corpus in the last M days. If $RSF(Q,CP_2,CP_1)<1.0$, the fraction can be read to indicate that the query is less popular in the $CP_2$ corpus than in the $CP_1$ corpus (e.g., the base corpus).

The relative search fraction is used to modify 4040 the ranking of search results for a new search corresponding to the search query. In some implementations, the relative search fraction is used as a measure of relative relevance to boost or lower the IR score for search results from the $CP_2$ corpus or the $CP_1$ corpus. The general assumption under such an approach is that, if the query was significantly more popular on one corpus relative to another corpus, then there is a reasonable incentive to display results from the more popular corpus or to boost the ranking of the results from the more popular corpus for future searches of the same query.

In some implementations, the IR score for search results from the base corpus is not modified by the relative search fraction. In the dolphins example with the web corpus chosen as the base corpus, if RSF(dolphins, image, web)≈2.3 and RSF(dolphins, news, web)≈0.8, the IR score for image search results and news search results for a new dolphins search query can be multiplied by 2.3 and 0.8, respectively, while the IR score for web search results remains unmodified.

In some implementations, the system tracks the number of search results selected SC(Q,CP) (i.e., clicked on) when the selected result is from the corpus in which the query was issued. This click data can indicate whether the search results displayed to the user have a high quality, i.e., the search results or type of search results returned were what the user wanted. The information provided by the click data differs from the information provided by search fractions. Search fractions provide information about which corpora users are choosing for issuing queries. In other words, search data indicate where users expect to see results of high quality, while click data indicate whether the results displayed are of high quality.

In some implementations, a measure of relative relevance based on the relative search fraction is used to modify the ranking of search results for a new search corresponding to the search query. The measure of relative relevance can be, for example, a scaled or normalized version of the relative search fraction. The relative search fraction can be scaled or normalized to generate a multiplier which is suitable for boosting the search results (i.e., produces boosted IR scores within a desired range). Additionally, the relative search fraction can be scaled or normalized to generate a measure of relative relevance which can be combined with other ranking modifier signals. In some implementations, the measure of relative relevance is based on both the relative search fraction and the number of clicks on search results from the corpus in which the query was issued.

The relative search fractions can be generated and stored for a set of most popular search queries. The data can be stored in a database or repository. In some implementations, the data or some portion of the data can be loaded into memory for fast lookup of the relevant search fractions. Given a search query, the information retrieval system can search the database or memory to determine if the search query has associated relative search fractions. If this information is available for the search query, the system can determine how popular the query is on the various corpora and can boost or lower the IR for search results from each corpus according to the retrieved relative search fraction (or another measure of relative relevance) for the query-corpus pair.

In some implementations, the measure of relative relevance is also based on statistics for particular search results presented for a given query. For example, for a given search query issued in a first corpus (e.g., web pages on the Internet), the information retrieval system can return a set of search results primarily from the first corpus for presentation in a user interface of a client device, where one or more of the search results presented is from a second corpus. In some implementations, the first corpus is chosen as a base corpus. If a user, presented with search results primarily from the first corpus, selects a result from the second corpus, this can indicate that the user finds results from the second corpus more relevant to the given query than results from the first corpus. The statistics used to calculate the measure of relative relevance can include statistics on the presentation (impression) and user selection (click) of these search results from the under-represented second corpus.

For example, the tracking component 2050 of FIG. 2 can be used to record the number of impressions ($OI(Q,CP_2,CP_1)$) and clicks ($OC(Q,CP_2,CP_1)$) of these search results from the under-represented corpus ($CP_2$) for a given query issued in a base corpus ($CP_1$). The recorded information can be stored in session log(s) 2060 or in search logs. In some implementations, a click through rate (CTR) is calculated for these search results by dividing the number of clicks by the number of impressions, i.e., $OCTR(Q,CP_2,CP_1)=OC(Q,CP_2,CP_1)/OI(Q,CP_2,CP_1)$. The CTR can be used as a direct signal of whether users will click on search results from the under-represented corpus, given the query. When a particular corpus (e.g., the web page corpus) is chosen as the base corpus, the CTR can be expressed as $OCTR(Q,CP)$, where CP is the under-represented corpus. In some implementations, a click measure can be based on a CTR, where the click measure can be used as a measure of relevance of the corpus to the query.

In some implementations, before a statistically significant CTR measure can be determined, the measure of relative relevance is initially based on the relative search fraction. Once a given search query becomes more popular (i.e., more searches for the given query are issued in one or more corpora), a statistically significant CTR measure (e.g., $OCTR(Q,CP)$) can be computed. The measure of relative relevance can then be based on a combination (e.g., a weighted combination) of the relative search fraction and the CTR measure for a query-corpus pair. In some implementations, the $OCTR(Q,CP)$ is weighted more heavily than the $RSF(Q,CP)$. In other implementations, the measure of relative relevance is only based on the $OCTR(Q,CP)$ or other statistics for the search results from the under-represented corpus for a given query.

In some implementations, for a search issued in a first corpus with results returned primarily from the first corpus, results are also returned from two or more different corpora. For example, a search issued in a web page corpus can return a large number of results from the web page corpus, a small number of results from an image corpus, and a small number of results from a video corpus.

In some implementations, the measure of relative relevance is based on the number of clicks on search results from a first corpus ($BaseC(Q,CP_2,CP_1)$) when the search was issued in the first corpus $CP_1$ and the set of results also includes results from one or more under-represented corpora, including the $CP_2$ corpus. For example, a user issuing a search in a web page corpus might receive ten results from the web page corpus, two results from an image corpus, and one result from a video corpus. If the user clicks on one of the ten results from the web page corpus, two counters for the web page corpus are incremented: $BaseC(Q, image, web)$ and $BaseC(Q, video, web)$. If the user clicks on a result from the under-represented image corpus or the under-represented video corpus, $OC(Q, image, web)$ or $OC(Q, video, web)$, respectively, is incremented.

A CTR can be calculated for the clicks on the first corpus (i.e., the base corpus) results by using the number of impressions, i.e., $BaseCTR(Q,CP_2,CP_1)=BaseC(Q,CP_2,CP_1)/OI(Q,CP_2,CP_1)$. The CTR for the first corpus, $BaseCTR(Q,CP_2,CP_1)$, and the CTR for a second corpus (i.e., an under-represented corpus), $OCTR(Q,CP_2,CP_1)$, can be used to generate measures of relevance for boosting or lowering the IR scores for search results from each of the two corpora. When the first corpus is chosen as the base corpus, $BaseCTR(Q,CP_2,CP_1)$ can be expressed as $BaseCTR(Q,CP)$, where CP is the under-represented corpus. The IR score for results from the under-represented, second corpus can be boosted or lowered based on a multiplier calculated relative to the base corpus CTR. For example, the multiplier can be the ratio of the under-represented corpus CTR, $OCTR(Q,CP)$, to the base corpus CTR, $BaseCTR(Q,CP)$. The ratio of the under-represented corpus CTR to the base corpus CTR can be used as a measure of relative relevance of the two corpora to the search query. As an example, searches for a given query issued in a web page corpus (i.e., the base corpus) could result in a 30% CTR for image results and a 15% CTR for web page results. For this example, the multiplier for the IR score for image results is equal to 2 (i.e., the ratio of 30% to 15%). The multiplier for the IR score for web page results is equal to 1, because the web page corpus is also the base corpus. Note in this example that the remaining 100%−30%−15%=55% of impressions is divided between clicks for other corpora (i.e., non-web and non-image corpora) and instances where the user did not select any of the search results presented.

In some implementations, a click measure can be based on the number of clicks on search results for a given search query from a corpus, where the click measure can be used as a measure of relevance of the corpus to the query. In some implementations, the measure of relative relevance is based on the number of clicks (e.g., $SC(Q,CP_2)$ or $OC(Q,CP_2,CP_1)$) on search results for a given search query from one corpus relative to the number of clicks (e.g., $SC(Q,CP_1)$ or $BaseC(Q,CP_2,CP_1)$) on search results for the given search query from another corpus. That is, a relative click fraction $RCF(Q,CP_2,CP_1)$ can be defined as, for example, $RCF(Q,CP_2,CP_1)=SC(Q,CP_2)/SC(Q,CP_1)$ or $RCF(Q,CP_2,CP_1)=OC(Q,CP_2,CP_1)/BaseC(Q,CP_2,CP_1)$. If $CP_1$ is chosen as a base corpus, the relative click fraction can be expressed as $RCF(Q,CP)$, where CP is the non-base corpus. In some implementations, the measure of relative relevance is based on a combination (e.g., a weighted combination) of the relative search fraction and the relative click fraction for a query-corpus pair. In some implementations, the $RCF(Q,CP)$ is weighted more heavily than the $RSF(Q,CP)$. In some implementations, the relative click fraction $RCF(Q,CP)$ for a given search query Q is defined as the number of clicks on search results from one corpus CP relative to the number of clicks on search results from all other corpora.

Alternatively, when search results from multiple corpora are presented in a unified interface, the number of impressions and clicks of search results from each corpus for a given query can be recorded. A user selection of a search result from a particular corpus, given a particular query, can be read as an indication that users find results from the particular corpus relevant to the particular query. This is a signal that indicates relevance like the a priori indication of preference by a user selecting a particular corpus for issuing a query. CTR statistics can be generated for each query-corpus pair using the impression and click data. The measure of relative relevance can be based on these CTR or click statistics alone or in combination with other statistics (e.g., the relative search fractions described above).

For a given query-corpus pair, the number of searches can be subdivided into different levels of granularity. For example, in the context of a web based information retrieval system, information recorded in search logs or in session logs can include the query (Q), the language (L) employed by the user, and the country (C) where the user is likely located (e.g., based on the server used to access the IR system). When language and country information is recorded, statistics for a query-corpus pair can include the number of searches aggregated by language, by country, by neither (i.e., a global statistic), or by both.

For example, a query search issued in French by a user connected to a server located in Switzerland can be recorded as (1) a global statistic aggregating the number of query-corpus searches across all countries and all languages, (2) a statistic by language (French) aggregating the number of query-corpus searches across all countries, (3) a statistic by country (Switzerland) aggregating the number of query-corpus searches across all languages, or (4) a statistic by language (French) and country (Switzerland) aggregating the number of query-corpus searches across only the given queries issued in French from Switzerland. The global statistic provides the lowest level of granularity while the language/country statistic provides the highest level of granularity in this example.

When multiple levels of granularity of search statistics are available, it is generally preferable to use or weight more heavily the statistic at the highest granularity, e.g., the combined language and country statistic for a given query-corpus pair. The general assumption under such an approach is that a user fluent in a particular language and from a particular country will likely find a particular search result more relevant (relative to other search results) if other users fluent in the same language and from the same country find that particular search result relevant. However, if the search query is issued from a country or in a language that represents a small proportion of all query traffic, better search results may be generated by weighing more heavily the statistics at the lower levels of granularity (e.g., the global statistic or the statistic based on language). Weighting and combining multiple statistics of varying granularity is described in more detail below.

In some implementations, the relative search fraction RSF $(k, CP_2, CP_1)$ for a given query-corpus pair is based on statistics from one level of granularity. For example, an information retrieval system can retrieve corpus search numbers $S(k, CP_1)$ and $S(k, CP_2)$ for a given query and two corpora, where k is a key that indicates a set of features, e.g., k=(Q,L,C) for a particular query Q, a particular language L, and a particular country C. Alternatively, the system can use a key of a lower level of granularity, such as, k=(Q,L) or k=(Q). In some implementations, the system retrieves the corpus search numbers for all three keys and selects the number with the highest level of granularity which passes a test (e.g., greater than a minimum threshold, indicating enough query-corpus searches for the set of key features to provide a reliable statistic).

The corpus search fractions $R(k, CP_1)$ and $R(k, CP_2)$ are computed by dividing the corpus search numbers $S(k, CP_1)$ and $S(k, CP_2)$ by $S(k', CP_1)$ and $S(k', CP_2)$, respectively, where k' is a key for the set of features in key k not including the query Q (i.e., if k=(Q,L,C), k'=(L,C)). That is, $R(k, CP_1)=S(k, CP_1)/S(k', CP_1)$ and $R(k, CP_2)=S(k, CP_2)/S(k', CP_2)$. Based on the corpus search fractions $R(k, CP_1)$ and $R(k, CP_2)$, the system can compute the relative search fraction as $RSF(k, CP_2, CP_1)=R(k, CP_2)/R(k, CP_1)$.

Similarly, the impression, click, and CTR data for the search results from the under-represented corpus or the base corpus (as described above) can also be stored or retrieved based on the key k set of features. In some implementations, this data is stored with other query-corpus search data in a database or repository. For a given query from the set of popular search queries with stored statistics, the relevant data can be accessed in the database or repository using the applicable key. For example, a key k=(Q,L,C) can be mapped to several statistics (described above) including S(k,CP), SC(k,CP), R(k,CP), OI(k,CP), OC(k,CP), and BaseC(k,CP) for each corpus CP.

The corpus search fraction R(k,CP) described above can be calculated as the number of searches in corpus CP for key k divided by the total number of searches in corpus CP, i.e., $R(k,CP)=S(k,CP)/S(k',CP)$. R(k,CP) can be updated at regular time intervals by incrementing S(k,CP) and S(k',CP) as new search log data becomes available, for example, once per day. In practice, there can be many queries where this approach does not capture the desired effect when measured over long time periods.

For example, R(k=(olympics), news) will probably be low prior to the start of the Olympic season, assuming that users typically do not search for news about the Olympics before the games happen. If R(k=(olympics), news) is continually updated over time by dividing the total number of searches aggregated since the beginning of time, then it will continue to be low after the first day of the Olympic season, because the data from the first day of the Olympics will have the same weight as all the days prior to the Olympic season. In this example, it is preferable to provide greater weight to the data on the first day of the Olympics. Presumably, there will be a significant amount of data on the first day, and this data can be used to predict the immediate future more accurately than the data aggregated across all time. In other words, in some instances, search result quality can be improved by capturing significant fluctuations in the corpus search fraction R(k,CP) over time.

In some implementations, the corpus search fraction R(k,CP) is computed by applying an exponential moving average to give greater weight to more recent search data. The weights can be computed dynamically as a function of the number of recent search instances observed.

For example, if $S_d(k,CP)$ denotes the number of query-corpus pair searches on day d and $S_{[d]}(k,CP)$ denotes the number of query-corpus pair searches on days [d]={1,2, ..., d}, the sequence $R_{[d]}(k,CP)$ can be defined as follows:

$$R_{[1]}(k,CP)=S_1(k,CP)/S_1(k',CP)$$

$$R_{[d]}(k,CP) \leftarrow \alpha^N R_{[d-1]}(k,CP)+(1-\alpha^N)S_d(k,CP)/S_d(k',CP)$$

where $N=\Sigma_{CP} S_d(k,CP)$. Thus, for a key k on day d, the database or repository can store the values $S_{[d]}(k,CP)$ and $R_{[d]}(k,CP)$ for each corpus CP. The intuition behind the exponent N is that the number of searches on all corpora in the recent data is a measure of the significance of the recent fluctuation. For example, if $\alpha=0.999$ and there were 1000 searches for all corpora on day d, a weight of $0.999^{1000} \approx 0.37$ can be applied to the data for days {1,2, ..., d-1}, and a weight of (1-0.37)= 0.63 can be applied to the data for day d.

When multiple levels of granularity of search statistics are available, a smoothed corpus search fraction $R_{smooth}$ can be In particular, the smoothed corpus search fraction $R_{smooth}$ can employ per-language and per-country fractions (with smoothing therebetween).

For example, an information retrieval system can retrieve R(k,CP) or $R_{[d]}$(k,CP) for a query-corpus pair using three keys: $k_1$=(Q), $k_2$=(Q,L), and $k_3$=(Q,L,C). As described above, the search statistic with the highest level of granularity (i.e., $k_3$=(Q,L,C)) generally provides the most relevant statistic. However, if there is only a small amount of data for $k_3$=(Q, L,C), then a more reliable composite measure can be computed by weighting statistics for $k_1$=(Q) and $k_2$=(Q,L) in addition to using the data for $k_3$=(Q,L,C).

A smoothed corpus search fraction $R_{smooth}(k_2,CP)$ can be defined as $$R_{smooth}(k_2,CP)=(K_Q+S_{Q,L})/[(K_Q/R(k_1,CP))+(S_{Q,L}/R(k_2,CP))]$$

where $K_Q$ is a constant independent of the query Q (e.g., 25) and $S_{Q,L}=\Sigma_{CP}S(k_2,CP)$. The intuition is that if the data for $k_2$=(Q,L) is significant (i.e., $\Sigma_{CP}S(k_2,CP)$ is high), then the value of $R_{smooth}(k_2,CP)$ tends towards $R(k_2,CP)$, and if the data is insignificant, it tends towards $R(k_1,CP)$. Because $S(k_2,CP)$ is the number of searches aggregated over all time, this smoothing will only make a significant difference for extremely rare queries for which little data have been collected.

Analogously, $R_{smooth}(k_3,CP)$ can be defined as $$R_{smooth}(k_3,CP)=(K_{Q,L}+S_{Q,L,C})/[(K_{Q,L}/R_{smooth}(k_2,CP))+(S_{Q,L,C}/R(k_3,CP))]$$

where $K_{Q,L}$ is a constant independent of the query Q (e.g., 50) and $S_{Q,L,C}=\Sigma_{CP}S(k_3,CP)$. Similar smoothing can also be applied to OCTR(k,CP). Different constants can be used for $K_Q$ and $K_{Q,L}$, or $K_Q$ and $K_{Q,L}$ can be equal. In some implementations, the smoothed corpus search fraction $R_{smooth}$(k, CP) is calculated using $R_{[d]}$(k,CP) (the corpus search fraction modified by the exponential decay function).

A relative search fraction $RSF(k,CP_2,CP_1)$ or a measure of relative relevance based on, for example, the relative search fraction, the relative click fraction, or a CTR measure, can be output to a ranking engine for ranking of search results for a new search corresponding to the search query. In particular, for a given query-corpus pair, the IR score for search results responsive to the query from the particular corpus can be boosted or lowered accordingly. The relative search fraction or measure of relative relevance can be passed through, for example, a transform to create a boosting factor that can be applied to the IR scores.

One example of a transform to create a boosting factor is a squashing function. In some implementations, the measure of relative relevance is a squashed relative search fraction. As described above, the relative search fraction can be defined as $RSF(k,CP_2,CP_1)=R(k,CP_2)/R(k,CP_1)$. Alternatively, $R_{[d]}$(k, CP) or $R_{smooth}$(k,CP) can be used to calculate the relative search fraction.

In some implementations, the relative search fraction can be transformed into a boosting factor for the IR score according to the following equation:

$$RSF_{squash}(k,CP_2,CP_1)=RSF(k,CP_2,CP_1) \times J/[RSF(k,CP_2,CP_1)+J-1]$$

where J is a constant, e.g., 40. For this squashing function, $RSF_{squash}(k,CP_1,CP_1)$=1 for all keys k, and $RSF_{squash}(k,CP_2,CP_1)$<J for all keys k. Other transforms are also possible. For example, a linear form boosting function or an exponential boosting function can be used. Such transforms can cause lower relative search fractions to generate almost no boost (e.g., a boost of about 1), whereas higher relative search fractions can generate a significant boost.

In any event, the transform employed can be adjusted based on the specific measure of relative relevance, and historical data combined with human generated relevance ratings (e.g., employed in a tuning process to select an appropriate boosting transform for a given implementation). Moreover, the measure of relative relevance can be used to modify and improve the ranking of search results generated for a given query, and the modified ranking can be presented to a user (e.g., on a display device in a web browser user interface).

Storing and updating query-corpus pair statistics for all possible search queries is generally not feasible. However, an inspection of query logs reveals that it is possible to impact a large fraction of the query stream by considering relatively few queries. In some implementations, the selection of queries for query-corpus pair statistics is made through filtering. For example, when session logs or search logs from a single day d are processed, counters for $S_d$(k,CP) are computed for each key k and corpus CP. If the entry for a particular $S_d$(k,CP) is below a threshold T, that $S_d$(k,CP) can be discarded. The threshold T can be fixed or varying. For example, T can be set based on the size of the repository or database used to store the query-corpus pair statistics. It should be noted that the number of query-corpus pair statistics selected can be greatly reduced by filtering out entries that only contain data for a single corpus.

Updates to the query-corpus pair statistics can occur on a regular basis, e.g., daily. For example, on day d, a "master" database (or repository) can store the query-corpus pair statistics for all corpora aggregated over days {1,2, ..., d−1}. The "master" database can be updated by merging it with another database (or repository) containing query-corpus pair statistics for all corpora for day d generated from session logs or search logs. In some implementations, the aggregated query-corpus pair statistics can be retrieved directly from the "master" database. Alternatively, the "master" database can spawn various pruned sub-databases which provide reduced sets of query-corpus pair statistics to various applications.

Figure 5:
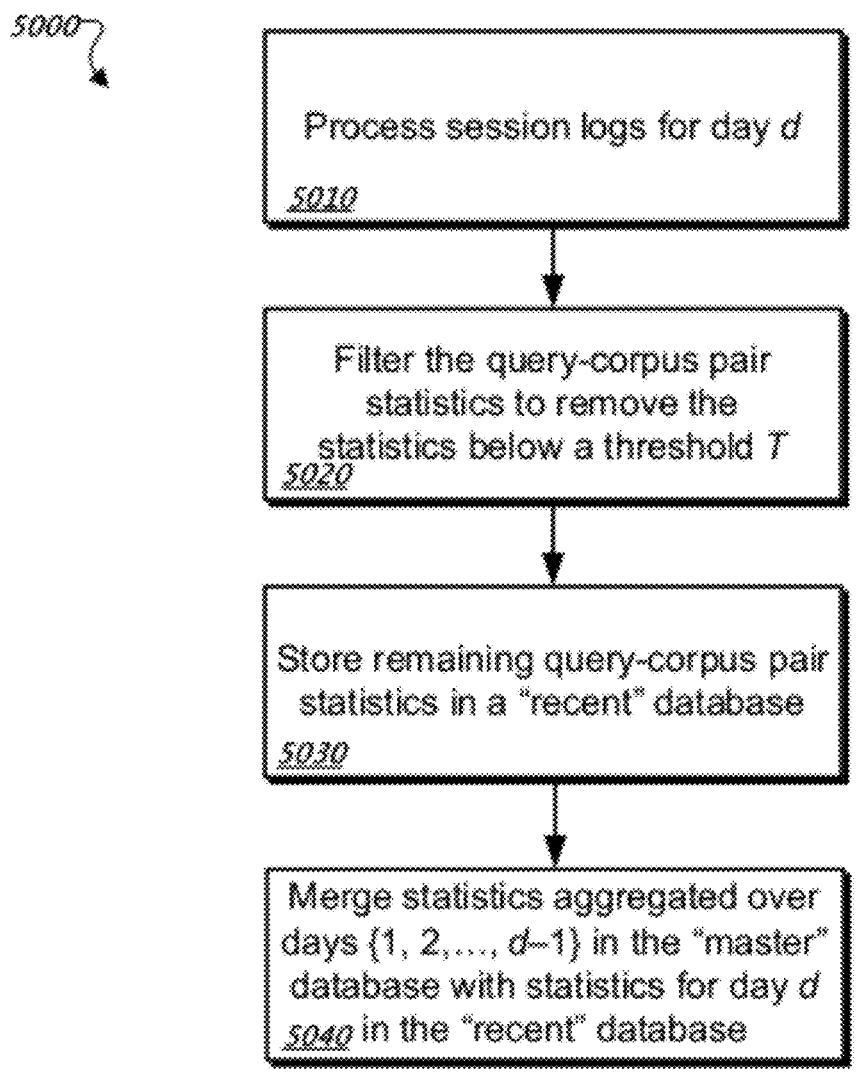
FIG. 5 shows an example process for updating query-corpus search pair statistics stored in a database.

FIG. 5 shows an example process 5000 for updating query-corpus search pair statistics stored in a database. Scripts process 5010 session logs for day d. For example, the scripts can accumulate and store query-corpus pair statistics, including S(k,CP), SC(k,Cp), R(k,CP), OI(k,CP), OC(k,CP), BaseC(k, CP), OCTR(k,CP), and BaseCTR(k,CP).

The query-corpus pair statistics are filtered 5020 to remove pair statistics which are below a threshold T. In some implementations, the threshold T can vary based on, for example, the query, the corpus, or the particular statistic (e.g., S(k,CP) versus OCTR(k,CP)).

The remaining query-corpus pair statistics are stored 5030 in a "recent" database (or repository), where each key k is mapped to a value which can include a list of statistics for one or more corpora.

The query-corpus pair statistics aggregated over days {1,2, ..., d−1} in the "master" database are merged 5040 with the query-corpus pair statistics for day d in the "recent" database. The updated "master" database contains the query-corpus pair statistics aggregated over days {1,2, ..., d}.

In some implementations, the corpus search fractions R(k, CP) are smoothed, generating $R_{smooth}$(k,CP), after the query-corpus pair statistics are updated. In some implementations, multiple key-mapped values which each contain query-corpus pair statistics for an individual corpus are merged to generate a unified key-mapped value which contains query-corpus pair statistics for two or more corpora. In some implementations, computed by weighting and combining the multiple statistics.

mentations, the "master" database spawns various pruned sub-databases with the updated statistics.

The measure of relative relevance, mapped by a key, for one or more corpora can be computed and returned using a corpus search boost function. An application programming interface (API) for the corpus search boost function can be defined as follows.

```
#include "header_file.h"
class CorpusBoostResults;
class Database_CollectionRT;
namespace globalsearch {
class CorpusBoostUtils;
class CorpusBooster {
  public:
    CorpusBooster( );
    ~CorpusBooster( );
    //
    // Lookup( )
    //   Given a (query,language,country), computes scores for each
    //   corpus based on a batch of lookups to the CorpusBoost database
    //   and returns them in CorpusBoostResults. The function returns true
    //   iff the lookup is successful.
    //   Argument description:
    //     squery:    An squery. The function normalizes the query
    //                appropriately for the CorpusBoost database.
    //     language:  A language code ("en", "ja", "zh-CN" etc.)
    //     country:   A two-letter country code ("us", "jp", "cn", etc.)
    //
    bool Lookup(const string& squery,
                const string& language,
                const string& country,
                CorpusBoostResults* results);
  private:
    scoped_ptr<CorpusBoostUtils> utils_;
    scoped_ptr<Database CollectionRT> database_;
};
}  // namespace globalsearch
```

Figure 6:
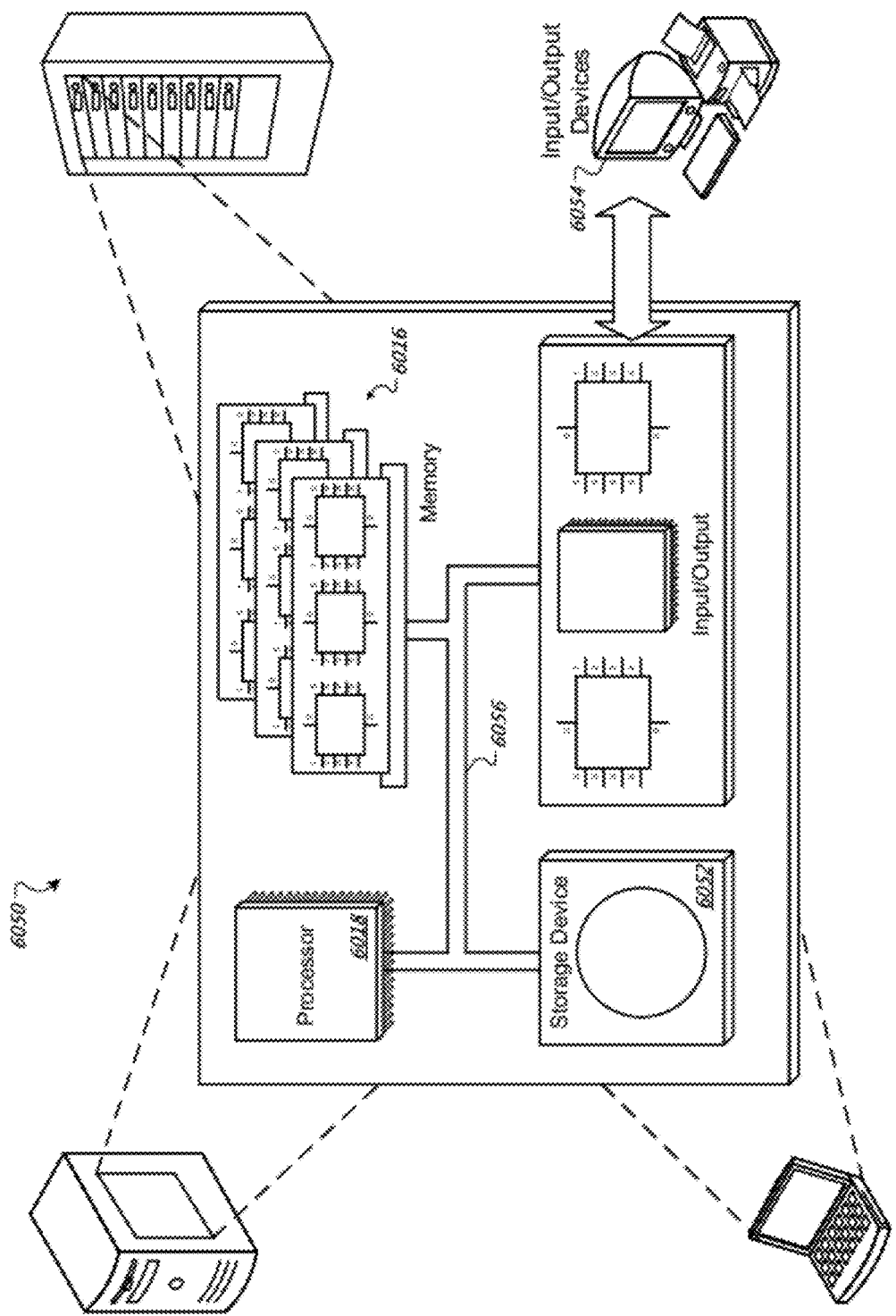
FIG. 6 is a schematic diagram of an example computer system.

FIG. 6 is a schematic diagram of an example computer system 6050. The system 6050 can be used for performing the actions and methods described above. The system 6050 can include a processor 6018, a memory 6016, a storage device 6052, and input/output devices 6054. Each of the components 6018, 6016, 6052, and 6054 are interconnected using a system bus 6056. The processor 6018 is capable of processing instructions within the system 6050. These instructions can implement one or more aspects of the systems, components, and techniques described above. In some implementations, the processor 6018 is a single-threaded processor. In other implementations, the processor 6018 is a multi-threaded processor. The processor 6018 can include multiple processing cores and is capable of processing instructions stored in the memory 6016 or on the storage device 6052 to display graphical information for a user interface on the input/output device 6054.

The memory 6016 is a computer readable medium such as volatile or non-volatile that stores information within the system 6050. The memory 6016 can store processes related to the functionality of the search engine 1030, for example. The storage device 6052 is capable of providing persistent storage for the system 6050. The storage device 6052 can include a floppy disk device, a hard disk device, an optical disk device, or a tape device, or other suitable persistent storage mediums. The storage device 6052 can store the various databases described above. The input/output device 6054 provides input/output operations for the system 6050. The input/output device 6054 can include a keyboard, a pointing device, and a display unit for displaying graphical user interfaces.

The computer system shown in FIG. 6 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. In some implementations, one or both of an exponential moving average function and a smoothing function can be applied to the click measure. In some implementations, a squashing function can be applied to the relative click fraction. In some implementations, the search and click data are used for analyzing search trends. In some implementations, the search and click data are used to provide suggestions for corpora other than the corpus in which a search query was issued. For example, when a given search query is issued in a base corpus, a list of non-base corpora can be returned along with search results from the base corpus. If one of the listed non-base corpora is selected, search results from the selected non-base corpus can be displayed, where the search results are responsive to the given search query.

What is claimed is:

1. A method implemented by data processing apparatus, the method comprising:
    determining, for a plurality of search results responsive to a query, a respective count of times search results in the plurality of search results that refer to documents in a base corpus have been presented, and a respective count of times search results in the plurality of search results that refer to documents in the base corpus have been selected, wherein the respective counts for presentations and selections of search results that refer to documents in the base corpus are for searches initiated by users in a plurality of different countries who employ a specific language;
    determining, for the plurality of search results responsive to the query, a respective count of times search results in the plurality of search results that refer to documents in a second corpus have been presented, and a respective count of times search results in the plurality of search results that refer to documents in the second corpus have been selected, wherein the respective counts for presentations and selections of search results that refer to documents in the second corpus are for searches initiated by users in the plurality of different countries who employ the specific language;
    calculating a click through rate of the base corpus for the query based at least in part on the respective counts for the base corpus;
    calculating a click through rate of the second corpus for the query based at least in part on the respective counts for the second corpus;
    calculating a measure of relative relevance based at least in part on a ratio of the second corpus click through rate to the base corpus click through rate; and providing the measure of relative relevance to a ranking engine for ranking of search results for a search corresponding to the query; and wherein fewer search results of the plurality refer to documents in the second corpus than to documents in the base corpus.

2. The method of claim 1 wherein the respective counts for the base and second corpora are derived from language-specific data or country-specific data, and wherein calculating a click through rate for one of the corpora further comprises selecting which data to use for the respective counts based on a determination that the selected data will provide a reliable statistic.

3. The method of claim 1 wherein the base corpus comprises web pages and wherein the second corpus comprises videos.

4. The method of claim 1 wherein the base corpus comprises web pages and wherein the second corpus comprises images.

5. The method of claim 1 wherein the click through rate of the base corpus or of the second corpus is a ratio of the count of selections to the count of presentations.

6. The method of claim 1 wherein the ranking engine is configured to increase a score of a search result for the query that refers to a document in the second corpus based at least in part on the measure of relative relevance.

7. The method of claim 1 wherein the respective counts for the base and second corpora are derived from language-specific data and country-specific data, and wherein calculating a click through rate for one of the corpora is based on a weighted combination of the language-specific data and the country-specific data.

8. The method of claim 7 wherein an amount of the language-specific data is greater than an amount of the country-specific data.

9. A system comprising:

a storage device encoded with instructions; and data processing apparatus operable to execute the instructions to perform operations comprising:

determining, for a plurality of search results responsive to a query, a respective count of times search results in the plurality of search results that refer to documents in a base corpus have been presented, and a respective count of times search results in the plurality of search results that refer to documents in the base corpus have been selected, wherein the respective counts for presentations and selections of search results that refer to documents in the base corpus are for searches initiated by users in a plurality of different countries who employ a specific language;

determining, for the plurality of search results responsive to the query, a respective count of times search results in the plurality of search results that refer to documents in a second corpus have been presented, and a respective count of times search results in the plurality of search results that refer to documents in the second corpus have been selected, wherein the respective counts for presentations and selections of search results that refer to documents in the second corpus are for searches initiated by users in the plurality of different countries who employ the specific language;

calculating a click through rate of the base corpus for the query based at least in part on the respective counts for the base corpus;

calculating a click through rate of the second corpus for the query based at least in part on the respective counts for the second corpus;

calculating a measure of relative relevance based at least in part on a ratio of the second corpus click through rate to the base corpus click through rate; and providing the measure of relative relevance to a ranking engine for ranking of search results for a search corresponding to the query; and wherein fewer search results of the plurality refer to documents in the second corpus than to documents in the base corpus.

10. The system of claim 9 wherein the respective counts for the base and second corpora are derived from language-specific data or country-specific data, and wherein calculating a click through rate for one of the corpora further comprises selecting which data to use for the respective counts based on a determination that the selected data will provide a reliable statistic.

11. The system of claim 9 wherein the base corpus comprises web pages and wherein the second corpus comprises videos.

12. The system of claim 9 wherein the base corpus comprises web pages and wherein the second corpus comprises images.

13. The system of claim 9 wherein the click through rate of the base corpus or of the second corpus is a ratio of the count of selections to the count of presentations.

14. The system of claim 9 wherein the ranking engine is configured to increase a score of a search result for the query that refers to a document in the second corpus based at least in part on the measure of relative relevance.

15. The system of claim 9 wherein the respective counts for the base and second corpora are derived from language-specific data and country-specific data, and wherein calculating a click through rate for one of the corpora is based on a weighted combination of the language-specific data and the country-specific data.

16. The system of claim 15 wherein an amount of the language-specific data is greater than an amount of the country-specific data.

17. A storage device encoded with a program product, the program product which, when executed by data processing apparatus, cause the data processing apparatus to perform operations comprising:

determining, for a plurality of search results responsive to a query, a respective count of times search results in the plurality of search results that refer to documents in a base corpus have been presented, and a respective count of times search results in the plurality of search results that refer to documents in the base corpus have been selected, wherein the respective counts for presentations and selections of search results that refer to documents in the base corpus are for searches initiated by users in a plurality of different countries who employ a specific language;

determining, for the plurality of search results responsive to the query, a respective count of times search results in the plurality of search results that refer to documents in a second corpus have been presented, and a respective count of times search results in the plurality of search results that refer to documents in the second corpus have been selected, wherein the respective counts for presentations and selections of search results that refer to documents in the second corpus are for searches initiated by users in the plurality of different countries who employ the specific language;

calculating a click through rate of the base corpus for the query based at least in part on the respective counts for the base corpus;

calculating a click through rate of the second corpus for the query based at least in part on the respective counts for the second corpus;

calculating a measure of relative relevance based at least in part on a ratio of the second corpus click through rate to the base corpus click through rate; and providing the measure of relative relevance to a ranking engine for ranking of search results for a search corresponding to the query; and wherein fewer search results of the plurality refer to documents in the second corpus than to documents in the base corpus.

18. The storage device of claim 17 wherein the respective counts for the base and second corpora are derived from language-specific data or country-specific data, and wherein calculating a click through rate for one of the corpora further comprises selecting which data to use for the respective counts based on a determination that the selected data will provide a reliable statistic.

19. The storage device of claim 17 wherein the base corpus comprises web pages and wherein the second corpus comprises videos.

20. The storage device of claim 17 wherein the base corpus comprises web pages and wherein the second corpus comprises images.

21. The storage device of claim 17 wherein the click through rate of the base corpus or of the second corpus is a ratio of the count of selections to the count of presentations.

22. The storage device of claim 17 wherein the ranking engine is configured to increase a score of a search result for the query that refers to a document in the second corpus based at least in part on the measure of relative relevance.

23. The storage device of claim 17 wherein the respective counts for the base and second corpora are derived from language-specific data and country-specific data, and wherein calculating a click through rate for one of the corpora is based on a weighted combination of the language-specific data and the country-specific data.

24. The storage device of claim 23 wherein an amount of the language-specific data is greater than an amount of the country-specific data.

* * * * *